No. 749,173. Patented January 12, 1904.

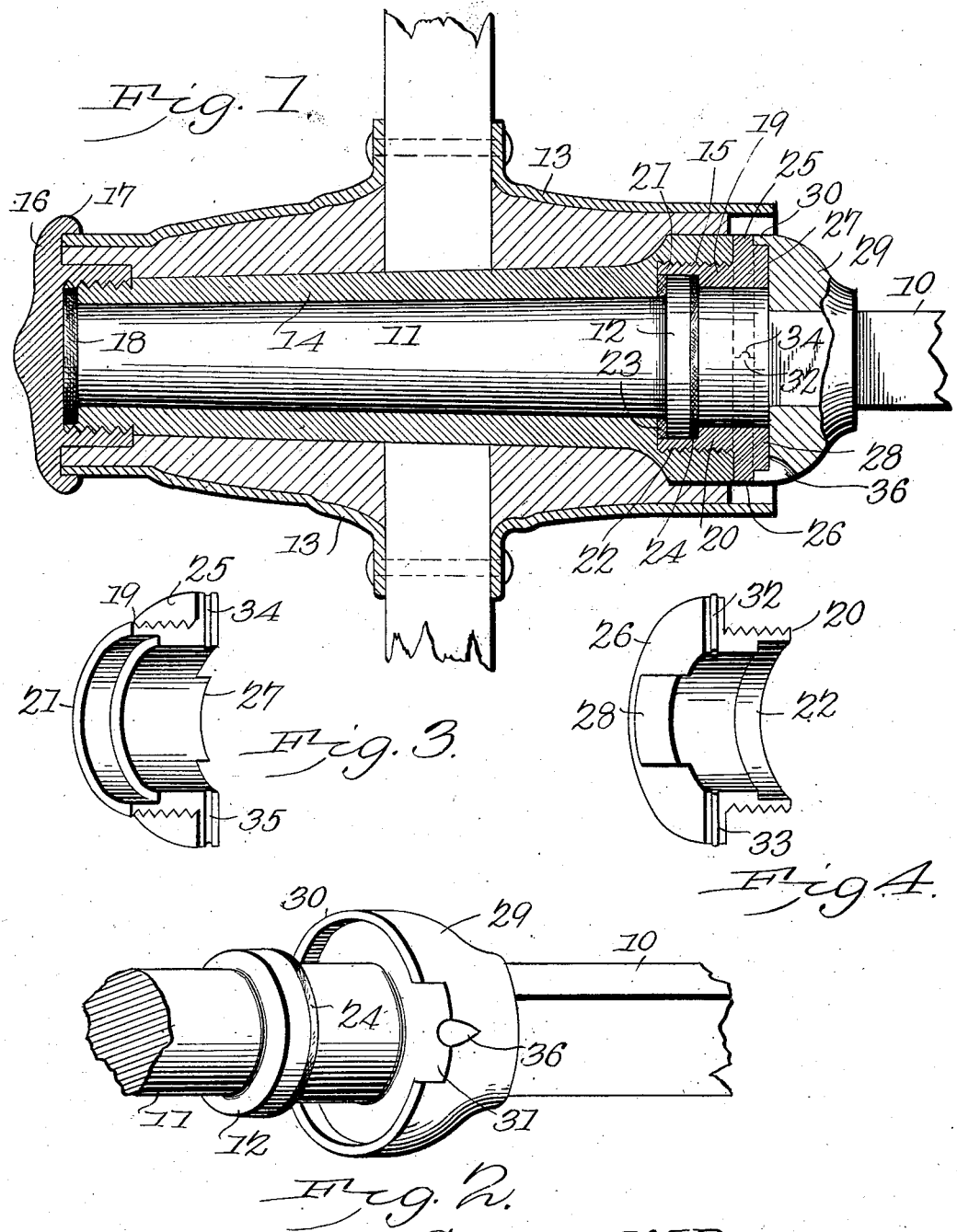

UNITED STATES PATENT OFFICE.

GEORGE W. DAVIS, OF PRINCETON, KANSAS.

VEHICLE-AXLE BOXING.

SPECIFICATION forming part of Letters Patent No. 749,173, dated January 12, 1904.

Application filed October 28, 1903. Serial No. 178,937. (No model.)

*To all whom it may concern:*

Be it known that I, GEORGE W. DAVIS, a citizen of the United States, residing at Princeton, in the county of Franklin and State of Kansas, have invented a new and useful Vehicle-Axle Boxing, of which the following is a specification.

This invention relates to devices employed for securing wheels upon their spindles, and has for its object to simplify and improve structures of this character and produce an economical and efficient means whereby the wheel may be quickly attached and detached without removing nuts or other parts and to securely hold the wheel in place while in motion and also effectually exclude dust and moisture and prevent the escape of the lubricant.

The invention consists in certain novel features of construction, as hereinafter shown and described, and specified in the claims.

In the drawings illustrative of the invention, in which corresponding parts are denoted by like designating characters, Figure 1 is a longitudinal sectional elevation of the spindle end of an axle and a wheel-hub with the improvement applied. Fig. 2 is a perspective view of a portion of the spindle and a portion of the axle and the sand-band detached. Figs. 3 and 4 represent the two-part nut detached and in perspective.

In the improved device the axle 10 is provided with the usual spindle 11 and integral collar 12 between the spindle and axle, but without the outer threaded end to the spindle. The hub is represented at 13, having the skein 14 for rotation upon the spindle, the skein provided with an internally-threaded cavity 15 opposite the collar 12 and somewhat larger than the latter, as shown. The outer end of the skein 14 is externally threaded and provided with a cap-nut 16, recessed into the hub and having a flange or rim 17 extending over the exterior of the hub and forming not only a closure to the outer end of the hub, but a "finish" and support thereto, as shown. The cap-nut is a permanent part of the hub and will effectually exclude all dust and moisture and also prevent the escape of the lubricant at the enter end of the hub. A flexible washer 18 is located between the cap-nut 16 and the outer unthreaded end of the spindle 11 to receive the "end thrust" of the axle and relieve the hub largely from strains which would be otherwise caused thereby.

Embracing the axle 10 in the rear of the collar 12 is a two-part sleeve 19 20, closely engaging the axle and rotative thereon and having forwardly-extending shells 21 22 closely engaging the collar 12 and projecting in advance thereof. The two-part sleeve is exteriorly threaded for engagement with the internally-threaded cavity 15, as shown.

Flexible packing-rings 23 24 are placed upon opposite sides of the collar 12, as shown.

The two-part sleeve-sections are respectively provided with semicircular flanges 25 26, bearing against the rear face of the hub, and the same sections are respectively provided with rearwardly-extending lugs 27 28.

Attached to the axle 10 in the rear of the two-part sleeve 19 20 is a sand-guard 29, having a flange 30 extending over the lugs 27 28 and engaging the rear faces of the flanges 25 26 and also provided with a cavity 31 through its rim or flange 30, corresponding in width to one of the lugs 27 or 28. The adjacent faces of the two-part sleeve are provided with interengaging ribs 32 33, grooves 34 35, so that when engaged the two sections will be held in proper coactive relation to insure the proper action of their threads with the threads in the cavity 15. This is an important feature of the invention and adds materially to the value and efficiency of the invention. When thus constructed, the two-part sleeve-sections 19 20 are slipped into their seats by passing their lugs 27 28 through the cavity 31 in the sand-guard and rotating the hub of the wheel upon the threaded exterior until the rear end of the hub engages the forward face of the flanges 25 26, when the wheel will thereafter be rotatively supported, but will not be removable longitudinally of the spindle.

To remove the wheel, a small implement, such as a heavy wire nail, is inserted into the small transverse cavity 36 to intercept one of the lugs 27 or 28 and the wheel rotated backwardly, when the two-part sleeve being held from turning the wheel will be quickly run off therefrom and removed from the spindle. By this means it will be obvious a very simply-constructed means is provided for connecting the wheel to the spindle, which requires no nuts to be removed in detaching it, which will effectually exclude dust and moisture, and will not work loose or rattle, as the flexible packing-washers prevent all end movement and receive all end thrust.

The parts are few in number and simple in form and are not liable to become disarranged or broken.

Having thus described the invention, what I claim is—

1. The combination with an axle having a spindle, of a hub having a skein rotative upon said spindle, and a divided sleeve for holding said skein against longitudinal movement on said spindle, the adjacent surfaces of said divided sleeve being reversely fluted and grooved to provide guiding means between them.

2. The combination with an axle having a lateral collar fixed to the inner end of its spindle, a hub having a skein rotative upon said spindle and provided with an internally-threaded cavity opposite said collar, a divided sleeve having a shell extending between said collar and skein and externally threaded to engage said threaded cavity, the adjacent surfaces of said divided sleeve being reversely fluted and grooved to provide guiding means between them, substantially as described.

3. The combination with an axle having an integral lateral collar at the inner end of its spindle, a hub having a skein rotative upon said spindle and provided with an internally-threaded cavity opposite said collar, a divided sleeve having a shell extending between said collar and skein and externally threaded to engage said threaded cavity, and each section provided with an external annular flange and rearwardly-extending stop-lug, and a sand-guard carried by said axle and extending into engagement with said flange and provided with a radial cavity corresponding to said lugs, substantially as described.

4. The combination with an axle having a spindle, of a hub having a skein rotative upon said spindle and externally threaded at its outer end, means for holding said hub against longitudinal movement on said spindle, and a cap-nut engaging the outer threaded end of said skein and provided with a rearwardly-extending flange spaced from the skein-engaging member and fitting over the outer end of the hub.

In testimony that I claim the foregoing as my own I have hereto affixed my signature in the presence of two witnesses.

GEO. W. DAVIS.

Witnesses:
F. D. WRIGHT,
J. S. YARHAM.